Oct. 8, 1940.   H. N. SHAW   2,217,296
ELECTRICAL HEATING ELEMENT
Filed Jan. 3, 1938   3 Sheets-Sheet 1

INVENTOR.
Harold N. Shaw
BY Morsell Lieber & Morsell
ATTORNEYS.

Oct. 8, 1940.   H. N. SHAW   2,217,296
ELECTRICAL HEATING ELEMENT
Filed Jan. 3, 1938   3 Sheets-Sheet 2
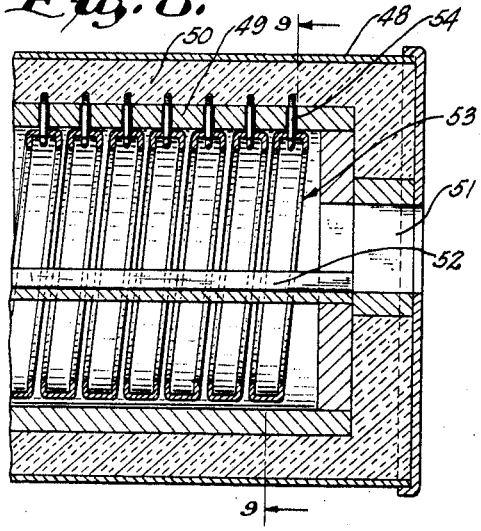
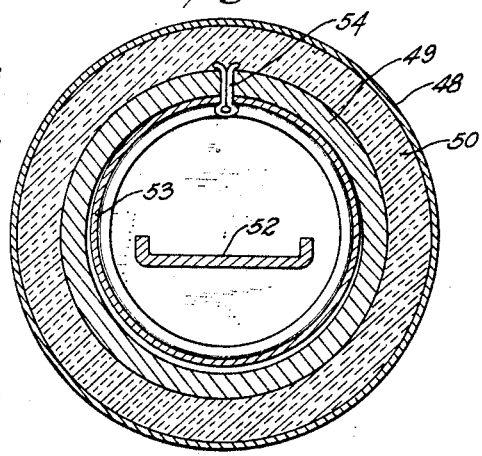
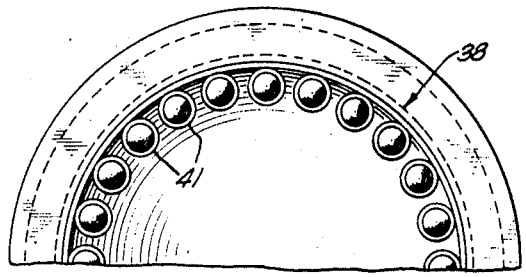
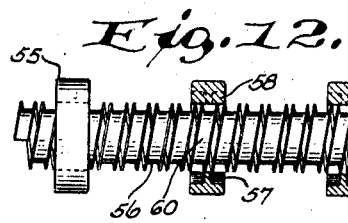
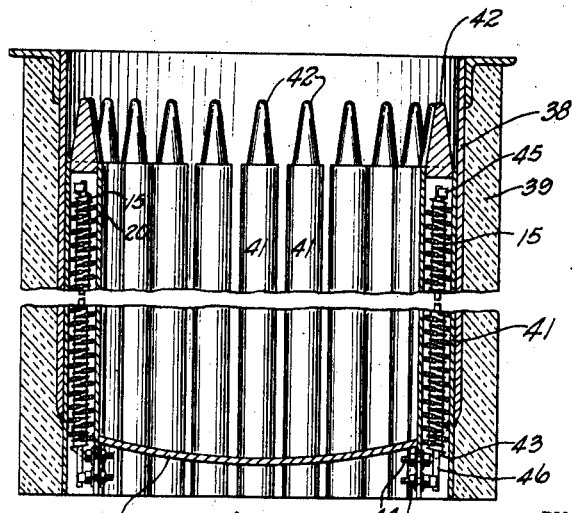
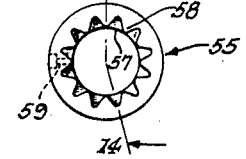
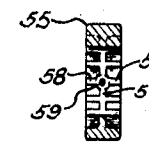
INVENTOR.
Harold N. Shaw
BY Morsell, Lieber, Morsell
ATTORNEYS.

Oct. 8, 1940.   H. N. SHAW   2,217,296
ELECTRICAL HEATING ELEMENT
Filed Jan. 3, 1938    3 Sheets-Sheet 3
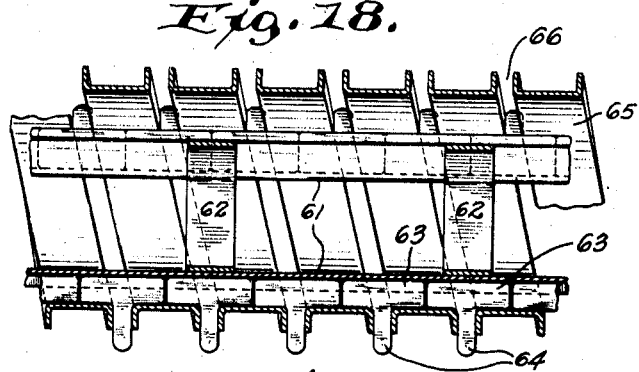
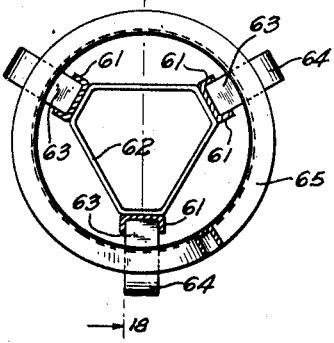
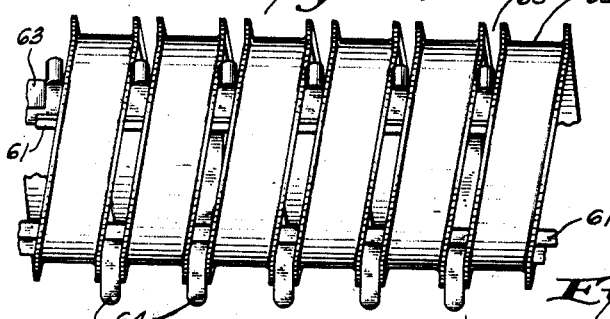
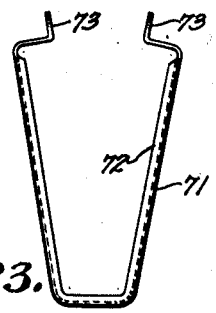
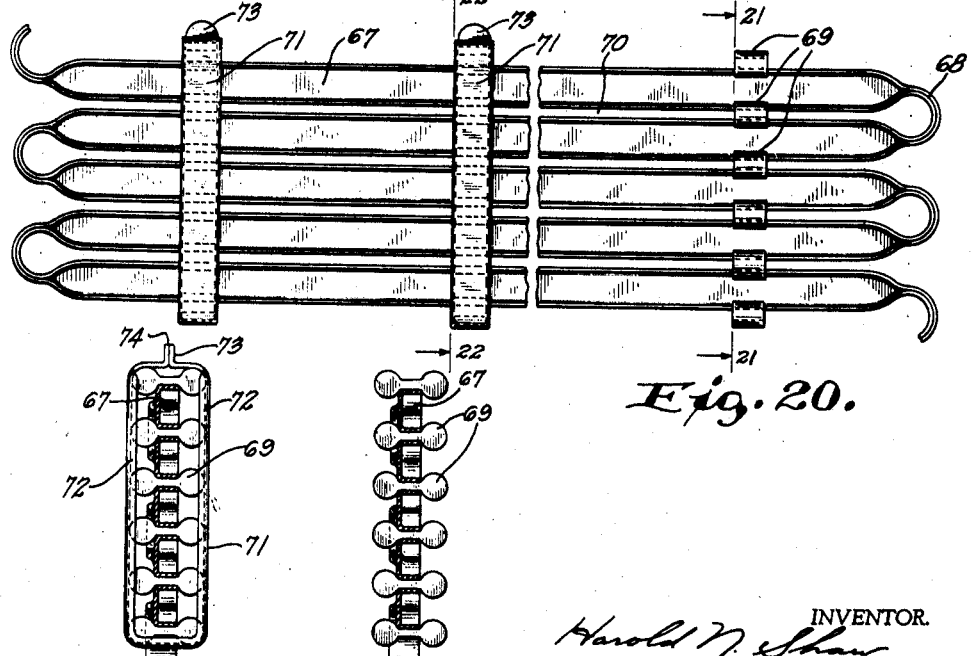
INVENTOR.
Harold N. Shaw
BY
ATTORNEYS.

Patented Oct. 8, 1940

2,217,296

UNITED STATES PATENT OFFICE 2,217,296

ELECTRICAL HEATING ELEMENT

Harold N. Shaw, Erie, Pa.

Application January 3, 1938, Serial No. 182,946

8 Claims. (Cl. 201—63)

This invention relates to improvements in electrical heating elements and more particularly to elements of the open radiant or convection type.

Heretofore it has been common practice to form heating elements from wire or flat ribbon wound in helical form, and these elements must be supported at intervals along their length by insulating members. Heretofore it has been necessary, in order to prevent sagging, to have these supports relatively close together, because the type of element used has been very susceptible to such sagging when weakened by the high temperatures to which it is subjected. Inasmuch as sagging is aggravated by increasing the weight of the element, there is no advantage in using heavier material except insofar as the vertical height of a section through the element is naturally increased. A heavier wire or ribbon is definitely objectionable in that it has less flexibility, lower electrical resistance, is expensive, and is sluggish in heating and cooling. This last characteristic frequently prevents control of temperature within narrow limits, as the heat stored in the heavy element may cause overheating after the electrical circuit is broken.

It is a principal object of the present invention to provide an improved heating element which is light in weight and which nevertheless can be satisfactorily supported against sagging on insulating supports spaced relatively far apart, the said element preferably being helical and formed from ribbon which is channel-shaped in cross section.

Heretofore the use of electric heating elements has been more or less limited because the elements are not suitable for use inside of long tubes or ducts, particularly when these ducts are curved. As a result it has not heretofore been practical to use heating elements in rectangular or U-shaped ducts which extend around the sides or bottom of a cylindrical receptacle, whereas from the heating angle this would be a very desirable arrangement. For example, large kettles are frequently cylindrical and provided with dished bottoms. This would require the use of heating element hoods of curved form and sometimes five or more feet in length. Obviously it has heretofore been impractical to secure insulating supports at close intervals inside of hoods of this type, and therefore heating elements have not been used in this manner in spite of the fact that they would be highly efficient.

It is a further object of the present invention, therefore, to provide insulated supporting members carried by the heating element itself and arranged in such a way that the element with its attached supports can be readily threaded into an elongated duct or housing without dislodging any of said supports.

A further object of the invention is to provide a heating element having insulating supports carried thereby in such a manner as to have a minimum of effect upon the efficiency of the heating element.

A more specific object of the invention is to provide insulating supporting members of helical shape, and preferably only one helical turn in length, adapted to be threaded at desired intervals onto a helical heating element between the turns thereof, the supporting members being so constructed as to retain themselves in position.

A further specific object of the invention is to provide insulated supporting members comprising a plurality of small segments of insulating material whereby the supporting members will be free to expand or contract as a result of temperature differences or temperature changes and whereby the danger of cracking portions of the insulators is eliminated.

With the above and other objects in view, the invention consists of the improved electrical heating element and all its parts and combinations as set forth in the claims and all equivalents thereof.

In the accompanying drawings in which the same reference numerals designate the same parts in all of the views:

Fig. 8 is a longitudinal sectional view through a portion of a cylindrical furnace illustrating a modified type of heating element embodied therein;

Fig. 9 is a sectional view taken on line 9—9 of Fig. 8;

Fig. 10 is a vertical sectional view through a melting pot, showing the use of the improved heating elements therein;

Fig. 11 is a fragmentary top view of said melting pot;

Fig. 12 is a side elevational view of one of the heating elements illustrating a bushing type of support therefor;

Fig. 13 is an end view of one of the bushings used in Fig. 12;

Fig. 14 is a sectional view taken on line 14—14 of Fig. 13;

Figs. 16 and 24 are similar views showing other modified cross-sectional shapes for the ribbon;

Fig. 17 is an end view illustrating a modification;

Fig. 18 is a sectional view taken on line 18—18 of Fig. 17;

Fig. 19 is a side view of the modification illustrated in Figs. 17 and 18;

Fig. 20 is a plan view of another modified form of element;

Fig. 21 is a sectional view taken on line 21—21 of Fig. 20;

Fig. 22 is a sectional view taken on line 22—22 of Fig. 20; and

Fig. 23 is an end view of an insulator holding clip alone.

Referring more particularly to the drawings, the numeral 15 designates the improved heating coil. This coil is formed from suitable metallic ribbon which is bent to channel shape in a pair of rolls and then wound on a mandril using suitable means to shape the flanges and properly space the turns. The result is the helical formation shown in Fig. 1 with the flanges 16 preferably extending outwardly and spaced slightly from one another so that adjacent turns are out of contact. Between each of the flanges of the ribbon is a flat base portion 17. One or more ends of the ribbon may be flattened out as at 18, and may be formed with an aperture 19 to facilitate connection to an electric terminal. The turns of the helix are so shaped as to obtain as large an effective radiating surface as possible, while permitting sufficient space between turns for the reception of an insulator of substantial thickness, as will be hereinafter described.

Figure 4:
Fig. 4 is a perspective view of a segment of the supporting member.

The insulating supporting members, designated generally by the numeral 20, are formed from a plurality of segments 21 of porcelain or other suitable insulating material. Each segment may be substantially V-shaped in side view and substantially dumbbell-shaped in cross-section. This dumbbell shape is produced by an enlarged inner portion 22 connected by narrow webbing 23 with a smaller enlarged outer portion 24 as shown in Fig. 4. The portion 22 has a flattened aperture 25 extending therethrough, and the portion 24 may have an aperture 26.

Figure 1:
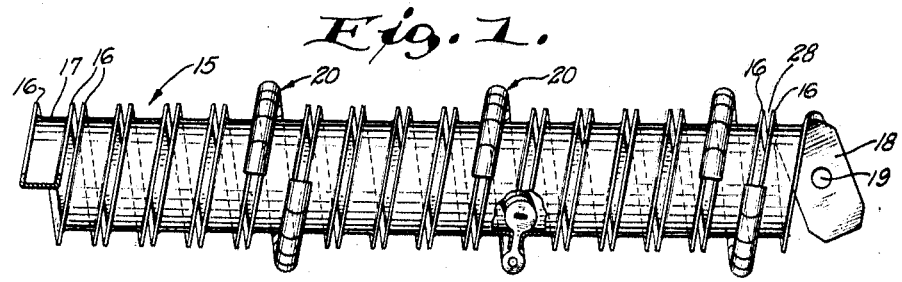
Fig. 1 is a side view showing a fragment of one of the improved heating elements with insulating supporting members threaded at intervals thereon.
Figure 3:
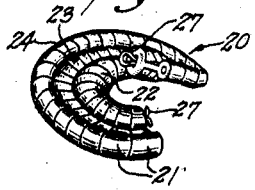
Fig. 3 is a perspective view of one of the helical supporting members.
Figure 2:
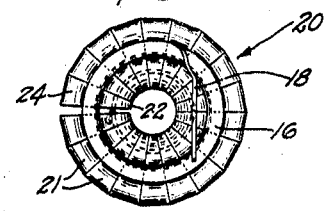
Fig. 2 is an end view of the heating element.

The segments 21 are preferably strung on a helical elongated cotter pin 27 extending through the alined apertures 25 of the segments, to produce the helical insulating supporting member shown in Fig. 3. The holes 26 at the outer ends of the segments may be used for a cotter pin when a pin on the inside is not practical. These segments 21 may be molded in a die with straight sides as it is not essential to have the segments conform to the helical shape of the group. Helical insulators having the final shape of Fig. 3 may, of course, be made from a single piece of porcelain. However, such insulators would be quite susceptible to breakage. The insulators are threaded in the grooves 28 formed between the turns of the helical element in the manner shown in Fig. 1 and may be spaced any desired distance apart according to particular conditions. In Figure 1, the insulating supporting members are shown as spaced five turns apart. There is just sufficient friction between the insulators and the flanges 16 of the heating element to hold the insulators in position, and the dumbbell shape of the segments absolutely precludes the insulators from slipping in or out of the grooves 28. The cotter pin 27 is effectively insulated from the coil by the segments themselves, and the outer portions 24 of the segments insulate and separate the coil from the side of a duct or the like within which the coil may be disposed. The inner portions 22 of the segments permit the passage of return leads entirely through the heating coils, and said return leads are obviously insulated from the coil by said inner portions 22 of the segments.

Referring again to Fig. 1, this flanged helical element may operate at about the same temperature as a close wound helix of flat ribbon, having the same outside diameter and the same power input per foot of length. The smaller diameter of the base of the channel is offset by the surface of the inner sides of the flanges, and the outer sides of the flanges more than compensate for the space between turns. The insulators effectively conduct heat away from the flanges between which said insulators are positioned. The portions 24 of the insulator segments which extend outwardly beyond the flanges, offer some interference with radiation from the opposite flanges 16, but this is offset by the lack of interference with the other side of the flanges where no insulators are in contact. For this reason it is not desirable to space the insulators any closer than every other turn, and for most purposes the insulators may be positioned still farther apart as shown in Figure 1. The flanges 16 may be additionally strengthened, if desired, by rolling over their edges.

In some instances each end of the coil may have one of the flattened portions 18 for connection with a binding post. In other instances, particularly for vertical installations, it may be desirable to connect the flattened lower end 18 of the coil to a binding post and to have a return lead welded to the upper end of the ribbon and extending back through the coil. This type of installation is shown in Fig. 10.

The use of channel-shaped ribbon for forming the heating element is very advantageous in that it makes it possible to minimize the sagging tendency of the coil without increasing the weight or cost thereof. When the axis of the element is horizontal as in Figure 1, the flanges 16 provide the increased vertical height necessary to minimize sagging, and when the elements are disposed vertically in use, the portions 17 of the channels provide the vertical height necessary to minimize sagging. With the turns of a horizontal helical element spaced apart however, there is a twisting force on the channel which may cause sagging, especially with elements of very thin ribbon. But elements operated at high temperatures acquire a coating of oxide which provides effective insulation between turns which touch, due to the broad area of contact between the relatively wide flat flanges. Therefore light weight elements can be constructed with a space between turns only sufficient for expansion and flexibility, then when the turns sag enough to touch, the twisting force disappears and the bending strength of the flanges effectively opposes further sagging. The initial sag is determined by the relation between the diameter of the element, the spacing of the insulators and the space between turns, and the abutting flanges prevent overlapping of the turns.

Due to the segmental formation of the insulators, there is sufficient flexibility to permit the insulator to adjust itself to variations in the size of the helix or in the size of the flanges, and this same flexibility also enables the insulator to adjust itself to changes due to expansion and contraction of the heating element in use.

Figure 5:
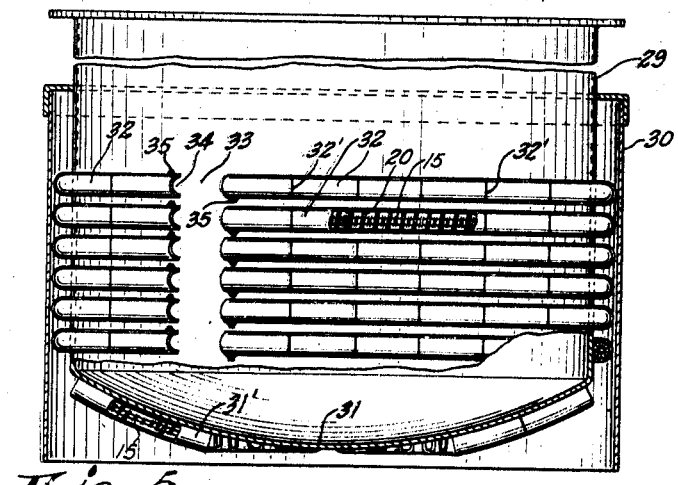
Fig. 5 is a side elevational view of a kettle equipped with the improved heating elements, parts being broken away and shown in section.

If the heating element is to be used around a sharp curve, then it is desirable to space the insulators only one turn apart or in substantially the same arrangement shown on the coils in Figure 5, which is also the same arrangement shown in Figure 10. By referring to the latter figure it will be seen that the ends of the insulators are all in substantial alinement, and these alined ends should form the inside of the curve, if the element is used around a curve as in Figure 5, to prevent portions of the coil from being squeezed into contact with each other and to thereby hold all turns apart. When the heating element is so used, the turn will of course open up on the outside of the curve, but the insulators will still be effectively held in position because of the cotter pins on which the segments are strung.

The apertures 25 in the insulator segments are flattened to prevent the segments from swinging during assembly and in order to keep the insulating segments in shape when they are not screwed on a heating element. A flat metal strip might be utilized in the alined apertures 25 in lieu of the cotter pins 27.

These insulating supporting members while particularly well adapted for use in connection with the improved form of heating coil, are nevertheless obviously capable of use on heating coils formed of flat ribbon which is not channel-shaped in cross section. The improved heating coil is also capable of being used in connection with other forms of insulating supports, and some of said forms will be hereinafter described.

Figure 7:
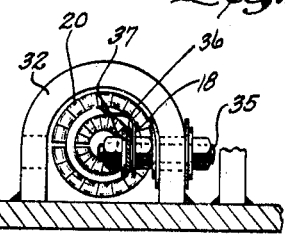
Fig. 7 is a fragmentary sectional view on an enlarged scale illustrating the end of one of the element hoods.
Figure 6:
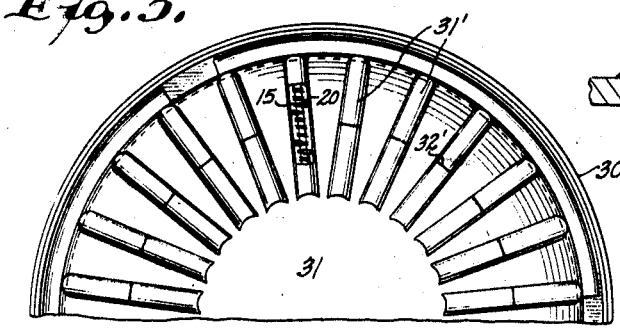
Fig. 6 is a fragmentary bottom view of said kettle; part being broken away and shown in section.

One adaptation for the improved type of heating coil is shown in Figs. 5, 6 and 7, and in said figures the numeral 29 designates a metal kettle of the type sometimes used for varnish, said kettle being preferably mounted in an outer jacket 30. The kettle 29 is cylindrical in shape and provided with a dished bottom 31. Extending around the sides of the kettle and welded thereto are hoods 32 formed of material having good heat conducting properties, and said hoods are preferably thick enough to conduct the heat which they absorb into the kettle so that there is little temperature difference between the outside of the hood and the kettle wall. These hoods are of curved form to conform to the shape of the kettle, and each row of hoods may consist of a plurality of sections, such as three in number, with the ends spaced apart as at 33. This permits the insertion of heating elements 15 into the hoods through the open ends 34. Each end of each hood may have a binding post as at 35 for connection with the flattened ends 18 of the elements. Due to the novel construction of the heating elements whereby the insulating members are carried thereby, the elements may be assembled with the insulators suitably spaced and then quickly threaded into the hoods. With the novel form of insulators there is positive assurance against any portion of the element contacting the hood or the side of the kettle. Heretofore it would have been practically impossible to assemble a heating element in a long curved hood of this type.

The inner surface of each hood should be black in color to minimize reflection of heat back onto the element. The welds between the hoods and the sides of the kettle should be as wide as the thickness of the metal forming the hood. By breaking the continuity of the hoods with slots 32' as illustrated, strains on the kettle are prevented.

The outer jacket 30 for the kettle is of a heat reflecting type, and while it does not raise the efficiency of the elements appreciably, nevertheless it does reduce heat losses from the kettle. Where the kettle is made of relatively shiny stainless steel or the like, the oxidized iron hoods absorb the heat which the kettle walls reflect when the heat strikes said walls, and said heat is then conducted to the kettle walls by the hoods. The bottom 31 of the kettle may be provided with radially extending hoods 31' which are similarly equipped with the improved heating elements 15.

A method of connecting the ends of the elements to the terminals 35 is shown in Figure 7, and it is preferred to employ silver washers 36 between the flattened end 18 of the heating element and the lug 37 on the connection wire. The lug is shown in section in Figure 7 and the connection wire is not illustrated. This insures a low resistance joint.

Kettles of this type may be used for industrial purposes, for melting soft metals, or for cooking foods. Flat plates equipped with elements positioned in hoods may be employed as cooking griddles. In some cases the hoods may be part of a cast plate or receptacle, and the back of the hoods may be used as a corrugated heating surface.

Figures 10 and 11 illustrate another type of use for the electrical heating elements, and in said figures the numeral 38 designates a melting pot of the type which may be used for melting stereotype plates. This melting pot may be insulated as at 39. Within the pot and extending through the bottom 40 thereof are vertical hoods 41, preferably formed with pointed or tapered upper ends 42. The hoods are welded to the apertures in the bottom through which they extend. These tubes make it possible to concentrate a large amount of heat in relatively deep pots having a small liquid surface. This is particularly desirable when melting lead alloys such as type metal, as the small surface reduces dross losses as well as heat losses. The vertical tubes also promote circulation of molten metal, and allow free expansion of the heating surface independently of the pot. Within each tube one of the heating elements 15 may be inserted from the bottom as illustrated. The lower end 43 of the heating element may be connected to a terminal 44, and the other end 45 of the heating element is welded to the upper end of a conducting rod 46, said rod forming a return lead extending back through the coil to connect with the other terminal 47.

The elements may be readily replaced in case of failure, and a leaking tube 41 may be plugged at the bottom to prevent loss of metal until such time as it is convenient to drain the pot and weld a new tube in place. The points 42 at the upper ends of the tubes are provided for the purpose of melting through the surface of the metal when re-heating, and serve to prevent strains due to the metal melting faster below the surface.

When this type of pot is used for lead hardening at relatively high temperatures, a thermo couple in the lead will provide close control of the temperature inasmuch as very little heat is stored in the elements because of their light weight and large area. Furnace type elements often require two controls in order to prevent overheating from heat stored in the elements and in the refractory walls.

Figures 8 and 9 illustrate a simple form of heat treating furnace of tubular form, the furnace having an outer steel shell 48, an inner refractory lining 49, an insulating material 50 therebetween. A door opening 51 may be provided at one end, which door communicates with a hearth 52. Within the refractory lining 49 and surrounding the hearth is a helical heating element 53 formed of ribbon which is channel-shaped in cross-section. The channels, however, face inwardly as illustrated instead of outwardly as in the form of the invention shown in Figure 1. Insulating supporting members of the type used in the principal form of the invention are not necessary. Instead, the element is supported by cotter pins 54 extending through the flat portions of the channels and through the refractory lining 49 of the furnace. Every turn of the element may be supported by a pin 54 as shown, or its equivalent, and the diameter of the element is less than that of the tube, as illustrated, to allow for expansion. The use of a channel-shaped ribbon in the heating element 53 makes it possible to obtain sufficient high resistance in small furnaces to allow direct connection to the power supply without using transformers such as are now required when heavy heating elements are used.

Referring more particularly to Figures 12, 13 and 14, there is illustrated a bushing type of insulator 55 suitable for use with small heating elements such as the elements 56. The insulator may be formed of porcelain or any suitable material, and its inner periphery is formed with a circular rib 57 and with transverse ribs 58. The heating elements may be inserted in the insulator bushings to rest on the ribs 58 thereof. The insulators may be held in position on the coil by inserting a pin or the like through the aperture 59, the said pin extending into the base portion 60 of the channel-shaped ribbon. A heating element thus supported is suitable for cooking equipment such as griddles.

Referring more particularly to Figures 17, 18 and 19, there is illustrated a heating element particularly adapted for vertical installation in the chamber of an open radiant heating furnace. The numeral 61 indicates channels of metal or suitable material which are held in proper position by supports 62 to which the channels may be welded or otherwise secured. Within each channel, is a row of insulators 63 of porcelain or other suitable material, which insulators may be substantially T-shaped, as shown in Fig. 18, with the stems 64 of the T's projecting outwardly from the channels. A heating coil 65, of helical form, and channel-shaped in cross section, may then be threaded onto the projections 64 of the insulators, as illustrated in Figs. 18 and 19, the projectors 64 being received in the spaces 66 between turns of the heating element. The result is a heating element of elongated form suitably supported by insulating supports, wherein there is a minimum of interference with radiation from the element.

Referring now more particularly to Figures 20 to 23 inclusive, another form of heating element is illustrated which is relatively flat in form for insertion in a relatively flat housing, or for use in any place wherein an element of this shape is desirable. A heating element 67 is formed from metal, preferably channel shaped in cross section, and the length of metal is arranged with reverse bends 68 as illustrated in Fig. 20, the channels being compressed as illustrated, to permit the formation of said reverse bends. In order to suitably insulate this type of element, porcelain insulators 69 which are preferably enlarged at the ends, are slipped into the spaces 70 and lined up in rows, as illustrated. These insulators may then be held in alinement by use of clips 71, see Fig. 23. These clips have channel shaped portions 72 to embrace the ends of the insulators as shown in Fig. 22, and the free end portion 73 of the clips may be welded or otherwise secured together as at 74 to hold the insulators in properly assembled relation on the heating element. The result is a heating element formed from channel shaped material carrying its own insulators, which element and insulators may be readily slipped into an elongated flat housing.

The above adaptations disclose only a few of the uses for the improved heating element and show only a few forms of insulators. The insulating supports of the type disclosed herein make practical the use of a long flexible insulated open radiant heating element which may be readily pushed or pulled into long ducts or pipes and said ducts may be of a flexible corrugated type to form a flexible immersion unit.

The improved heating elements are suitable for use in connection with wire annealing furnaces, hood or pit type furnaces, meat broilers, kettles for deep fat frying, pickling or plating tanks, bayonet type immersion heaters, bread toasters, electric ovens, convection air heaters, and the like.

Figure 15:
Fig. 15 is a cross-sectional view of a modified form of ribbon for forming a helical heating coil.
Figure 16:

It is obvious that while the channel shape for the ribbon forming the heating element is the most satisfactory, a ribbon which is L-shaped in cross section, as illustrated in Fig. 15, or V-shaped in cross section as illustrated in Fig. 16, or N-shaped would also be desirable and an improvement over the usual type of heating element, and in the claims the term "channel" includes cross-sections. The improved heating element may obviously be supported on various types of insulators, and while the improved insulator as illustrated is particularly adapted for cooperation with this type of heating element, it is nevertheless suitable for use in connection with other types of heating elements.

The heating elements may be used as a control resistance in power circuits as well as for heating purposes.

While only a few forms of the invention have been shown and described, it is obvious that various other changes and modifications may be made without departing from the spirit of the invention, and all of such changes are contemplated which may come within the scope of the claims.

What I claim is:

1. An electrical heating element comprising an elongated helix of metal, and insulating supports of helical shape threaded at spaced intervals onto the element between the turns thereof, said supports being substantially dumb-bell shaped in cross section to engage above and below the edges of the metal forming the element.

2. An electrical heating element comprising an elongated helix of metal, and insulating supports of helical shape threaded onto the element between the turns thereof, said supports being each formed of a plurality of segments having means overlapping the edges of the metal forming the turns to hold the segments in position between turns, and means in addition to the heating element connecting said segments.

3. An electrical heating element comprising an elongated helix of metal, and insulating supports of helical shape threaded at spaced intervals onto the element between the turns thereof, said supports being each formed of a plurality of segments having alined slots, and an elongated cotter pin extending through the slots of the segments to connect the same.

4. An electric heating element comprising an elongated continuous strip of metal channel-shaped in cross-section arranged in circuitous form, and insulating supports carried at intervals by the element between the sides of the channels and having portions projecting beyond said sides to serve as supporting means for the element.

5. An electric heating element comprising an elongated continuous strip of metal channel-shaped in cross-section arranged in circuitous form, and insulating supports carried at intervals by the element between the sides of the channels, said insulating supports having at least one enlarged end overlapping adjacent element portions and projecting beyond the sides of the channel to serve as supporting means for the element.

6. An electric heating element comprising an elongated ribbon of metal arranged in helical form, said ribbon being substantially U-shaped in cross-section to provide edge flanges with said flanges free from each other whereby the helical element is transversely flexible.

7. An electric heating element comprising a metallic ribbon arranged in helical form to provide adjacent turns which are spaced from one another, each edge of the ribbon having a flat flange, and the spaces between turns of the ribbon being substantially rectangular in cross-section and being normally open for radiation on two opposite sides and bounded by the flat flanges on the other two sides.

8. An electrical heating element comprising an elongated helix of metal, and insulating supports of helical shape threaded onto the element between the turns thereof, said supports being each formed of a plurality of segments having alined openings, and an elongated member extending through the openings of the segments to connect the same, said segments being formed with means cooperable with the edges of the metal forming the heating element to maintain the insulating supports in position.

HAROLD N. SHAW.